United States Patent
Kuo et al.

(10) Patent No.: US 8,719,858 B2
(45) Date of Patent: May 6, 2014

(54) METHOD FOR PERSONALIZED VIRTUAL CHANNEL MANAGEMENT AND NETWORK-BASED MULTIMEDIA REPRODUCTION SYSTEM WITH VIRTUAL CHANNELS

(71) Applicant: Wistron Corporation, New Taipei (TW)

(72) Inventors: Fang-Wen Kuo, New Taipei (TW); Li-Hsuan Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 13/762,558

(22) Filed: Feb. 8, 2013

(65) Prior Publication Data

US 2013/0326558 A1 Dec. 5, 2013

(30) Foreign Application Priority Data

Jun. 5, 2012 (TW) ............................... 101120181 A

(51) Int. Cl.
*H04N 7/16* (2011.01)
*H04N 5/445* (2011.01)
*G06F 3/00* (2006.01)
*G06F 13/00* (2006.01)

(52) U.S. Cl.
USPC ................ 725/27; 725/25; 725/30; 725/37; 725/60; 725/61

(58) Field of Classification Search
None
See application file for complete search history.

(56) References Cited

U.S. PATENT DOCUMENTS

| | | | |
|---|---|---|---|
| 7,506,066 B2 | 3/2009 | Nobakht et al. | |
| 2004/0078806 A1* | 4/2004 | Johnson et al. | 725/9 |
| 2005/0166235 A1 | 7/2005 | Mears et al. | |
| 2011/0088066 A1 | 4/2011 | Kim | |
| 2012/0222062 A1* | 8/2012 | Strickland | 725/30 |

* cited by examiner

*Primary Examiner* — Justin Shepard
(74) *Attorney, Agent, or Firm* — McClure, Qualey & Rodack, LLP

(57) ABSTRACT

A method for personalized virtual channel management includes: determining whether a received command is associated with virtual channel switching, wherein a network-based multimedia reproduction system is in mode of a first channel zone of a personalized channel zone; if yes, checking whether a channel value corresponding to the command exists in the first channel zone; if yes, executing an application corresponding to the channel value in the first channel zone to retrieve digital contents and display the digital contents on a screen of the network-based multimedia reproduction system; determining a desired channel zone if the command is associated with switching of the personalized channel zone; checking whether at least one log-in command matches log-in information of the desired channel zone; if yes, switching the network-based multimedia reproduction system to a mode of the desired channel zone in the personalized channel zone.

23 Claims, 6 Drawing Sheets

METHOD FOR PERSONALIZED VIRTUAL CHANNEL MANAGEMENT AND NETWORK-BASED MULTIMEDIA REPRODUCTION SYSTEM WITH VIRTUAL CHANNELS

This application claims the benefit of Taiwan application Serial No. 101120181, filed Jun. 5, 2012, the subject matter of which is incorporated herein by reference.

BACKGROUND

1. Field of the Disclosure

The disclosure relates in general to a method and apparatus for selecting contents of a network-based multimedia reproduction system, and more particularly to a method for personalized virtual channel management and a network-based multimedia reproduction system with virtual channels.

2. Description of the Related Art

Transmitting video images via the broadband Internet is a part of a prevalent alternative way of watching videos or television programs. To put a current Internet video function or an Internet TV to use, a corresponding application needs to be installed in advance or installed by a user. Each application has its dedicated user operation interface and approach for providing contents. A user generally selects desired contents by employing four direction buttons (i.e., up, down, left and right arrow buttons), a confirm or select button, and a back or return button. The above operations are far complicated compared to simply entering numbers or adding/subtracting numbers. Further, a user needs to look directly and attentively at a screen in order to select desired contents. However, with diversified contents and types rendered by the Internet, a relaxed atmosphere of enjoying watching the television as originally intended may instead turn out to be rather grave and complicated. As a result, not only utilization barriers are added to this kind of television in a household or in a group, but also the television may fall short in satisfying needs of different users.

SUMMARY

The disclosure is directed to a method for personalized virtual channel management and a network-based multimedia reproduction system with virtual channels.

According to an embodiment, a method for personalized virtual channel management including the following steps is provided. In response to a received command, a control unit of a network-based multimedia reproduction system determines whether the command is associated with virtual channel switching. The network-based multimedia reproduction system is in a mode of a first channel zone of a personalized channel zone. When the command is associated with virtual channel switching, the control unit checks whether a channel value corresponding to the command exists in the first channel zone. When the channel value exists in the first channel zone, the control unit executes an application corresponding to the channel value in the first channel zone to retrieve digital contents and display the digital contents on a screen of the network-based multimedia reproduction system by a network unit of the network-based multimedia reproduction system. When the received command is associated with switching of the personalized channel zone, the control unit determines a desired channel zone (i.e., a channel zone to be switched to) from the personalized channel zone representing a channel value corresponding to the received command. The control unit further checks whether at least one log-in command matches log-in information needed for switching to the desired channel zone. When the at least one log-in command matches the log-in information needed for switching to the desired channel zone, the network-based multimedia reproduction system is switched to a mode of the desired channel zone in the personalized channel zone. Thus, by the control unit, the network-based multimedia reproduction system achieves virtual channel switching and displays digital contents according to a plurality of virtual channels corresponding to the desired channel zone.

According to another embodiment, a network-based multimedia reproduction system having virtual channels is provided. The network-based multimedia reproduction system includes a display unit, a storage unit, a network unit, and a control unit. The storage unit stores information of a personalized channel zone. The control unit, coupled to the network unit, determines whether a command is associated with virtual channel switching in response to the command received. The network-based multimedia reproduction system is in a mode of a first channel zone of the personalized channel zone. When the command is associated with virtual channel switching, the control unit checks whether a channel value corresponding to the command exists in the first channel zone. When the channel value corresponding to the command exists in the first channel zone, the control unit executes an application corresponding to the channel value in the first channel zone, and the network unit retrieves digital contents and displays the digital contents on the display unit. When the received command is associated with switching of the personalized channel zone, from the personalized zone, the control unit determines a desired channel zone (i.e., a channel zone to be switched to) representing a channel value corresponding to the received command, and checks whether at least one log-in command matches log-in information needed for switching to the desired channel zone. When the at least one log-in command matches the log-in information needed for switching to the desired channel zone, the control unit switches the network-based multimedia reproduction system to a mode of the desired channel zone in the personalized channel zone, and controls the network-based multimedia reproduction system to perform virtual channel switching and to display the digital contents according to a plurality of virtual channels corresponding to the desired channel zone.

The above and other aspects of the disclosure will become better understood with regard to the following detailed description. The following description is made with reference to the accompanying drawings.

DETAILED DESCRIPTION

A method for personalized virtual channel management and a network-based multimedia reproduction system having virtual channels are described in the embodiments below. According to the embodiments, virtual channels are implemented in the network-based multimedia reproduction system to allow a user to activate an application or to switch to another application by way of channel switching, so that a user can select and watch desired digital contents with ease. For example, the network-based multimedia reproduction system is a display/playback system connectable to a multimedia source on the Internet (e.g., through wired or wireless means), such an Internet TV, a smart TV, an Internet multimedia player or device. Further, by establishing different channel zones each configured as containing user favorite channels or suitable channels, a user is allowed to select or watch virtual channels corresponding to a particular channel zone when the network-based multimedia reproduction system enters a mode of the particular channel zone.

Figure 1:
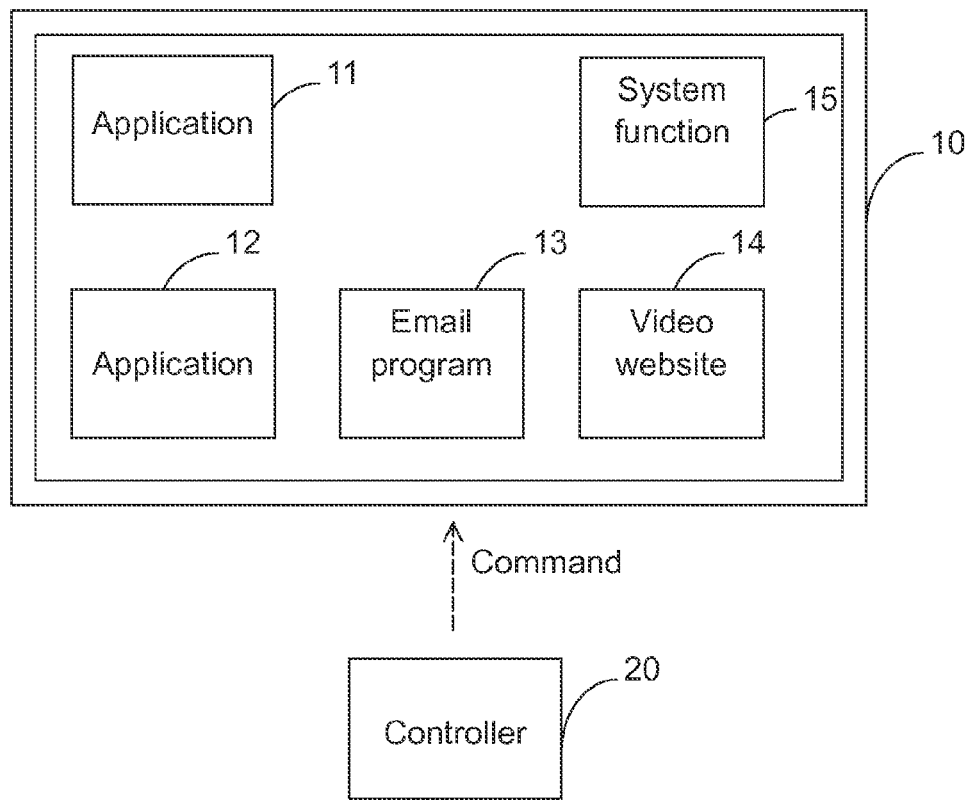
FIG. 1 is a schematic diagram of a network-based multimedia reproduction system with virtual channels, receiving a command.

In an embodiment, a virtual channel corresponds to an operation mode of an application. By selecting the virtual channel, the corresponding application is activated to present desired contents to a screen of the network-based multimedia reproduction system. In addition to a program to be installed such as an Internet TV application, an application may also be a request or use of network services such as applications for watching videos from a video sharing website (e.g., YouTube), browsing webmail (e.g., Gmail), chatting online (e.g., instant messaging tools), and browsing online photo albums. FIG. 1 shows a schematic diagram of a network-based multimedia reproduction system 10 having virtual channels receiving a command. The network-based multimedia reproduction system 10 is capable of executing multiple applications 11 to 14 to present digital contents on a screen, e.g., in a full screen or in other proportions. The network-based multimedia reproduction system 10 receives a command transmitted by a controller 20 (e.g., an electronic device such as a remote controller or a handheld device), and determines whether the command is associated with virtual channel switching. For example, when a channel code 100 of the virtual channels is pressed by a user, it means that the application 11 is executed to select and watch a particular online program. Similarly, pressing a channel code 200 of the virtual channels triggers the execution of the application 13 for browsing emails in an inbox of an email account. For another example, a channel jump or return, an input source change, a setting of a favorite channel list or an electronic program guide (EPG) performed on the controller 20 may all trigger channel switching. The above virtual channels may be referred to as content channels.

In an embodiment, the virtual channels may further include applications corresponding to functions operated by the network-based multimedia reproduction system 10, e.g., setting channel contents of a channel zone, executing an application of system settings, operating a directory page (e.g., a program guide), and utilizing an entry point. Such type of virtual channels are referred to as operation function channels. By selecting such type of virtual channel, the correspondingly application is activated to perform an application service or program that is not based on watch-oriented contents. For example, a system function program 15 may be activated by a channel code 001 to set system functions.

Figure 2:
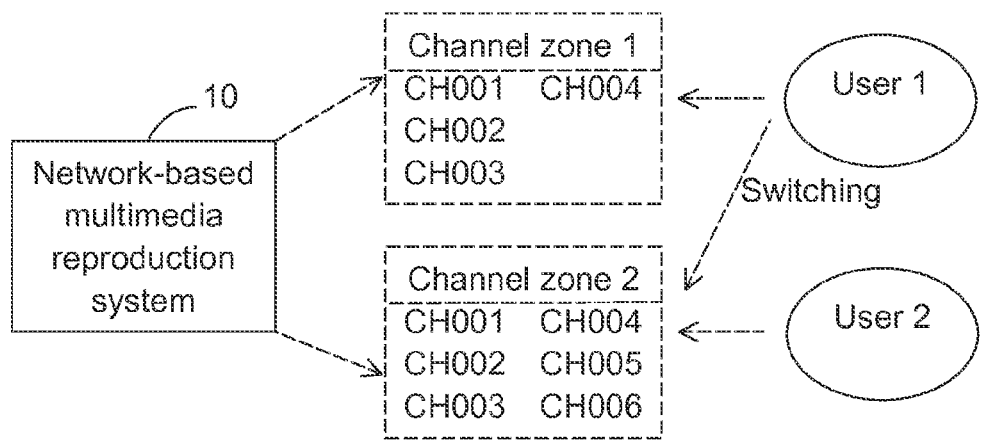
FIG. 2 is a schematic diagram of virtual channels corresponding to a network-based multimedia reproduction system providing a personalized channel zone.

With the establishment of virtual channels, a personalized channel zone having two or more virtual channels can be further established. Each channel zone may be configured to include favorite or suitable programs of a corresponding user. For example, users 1 and 2 have respectively channel zones 1 and 2 in the schematic diagram in FIG. 2. The network-based multimedia reproduction system 10 may enter and operate in a mode of the channel zone 1 or 2. Thus, the user 1 is allowed to select a plurality of virtual channels corresponding to the channel zone 1, e.g., four virtual channels from CH001 to CH004; the user 2 is allowed to select a plurality of virtual channels corresponding to the channel zone 2, e.g., six channels from CH001 to CH006.

In different channel zones, a same channel code, e.g., 001, may be set to correspond to contents of the same or different virtual channels to allow different users to conveniently select favorite or suitable channels using the foregoing switching approach. Accordingly, users of the platform, i.e., the network-based multimedia reproduction system 10, can conveniently achieve classified management. For example, for grown-ups and children of a household, several appropriate virtual channels are assigned to one channel zone such as a channel zone 1 for the use of the children in the household, whereas a channel zone 2 can be reserved for the grown-ups. When the network-based multimedia reproduction system 10 operating in the mode of the channel zone 1 is instructed to switch to a virtual channel that is not provided in the channel zone 1, e.g., the channel code 006, the user is requested to enter log-in information (e.g., a password). If the log-in information fails to pass log-in verification, switching is then declined to prevent children from watching unsuitable virtual channels. Further, details of a predetermined channel zone before shipping the network-based multimedia reproduction system 10 out of the factory may also be redefined, so as to allow a user with system configuration experiences or management responsibilities to switch channels or configure system settings as desired.

In an alternative embodiment, an approach of entering a channel zone after powering on the network-based multimedia reproduction system 10 may also be user-configurable. For example, a user may set the network-based multimedia reproduction system 10 to automatically enter a predetermined channel zone or to enter a predetermined channel zone through user selection or user logging in after the network-based multimedia reproduction system 10 is powered on. It should be noted that, the technique for implementing the personalized virtual channels are not limited to the above examples, and associated embodiments shall be shortly described. In the embodiment below, to explain details of a method for personalized virtual channel management, a situation of performing virtual channel switching after the network-based multimedia reproduction system 10 is powered on and enters a particular channel zone is taken as an example.

Figure 3:
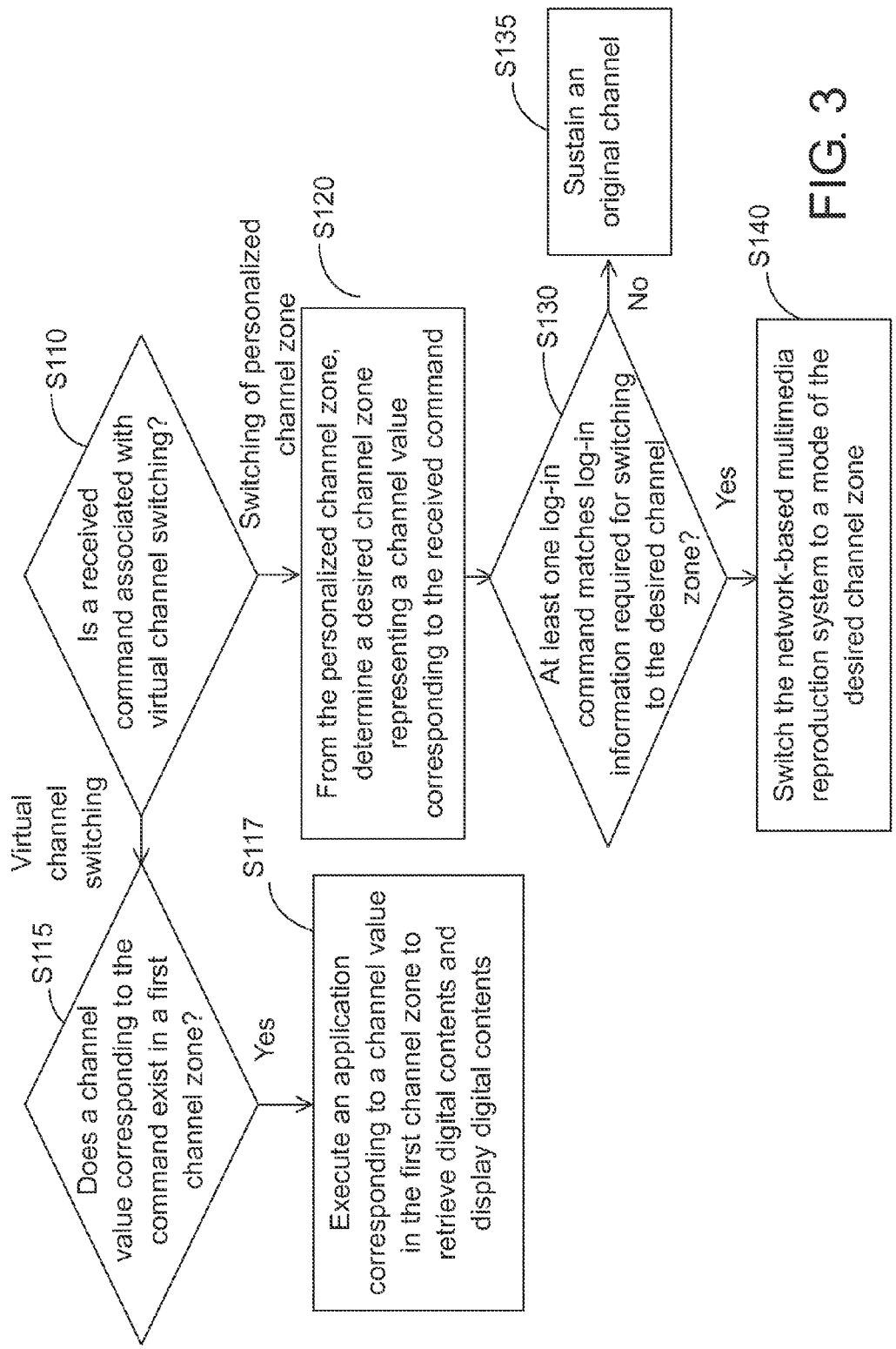
FIG. 3 is a flowchart of a method for personalized virtual channel management according to an embodiment.
Figure 4:
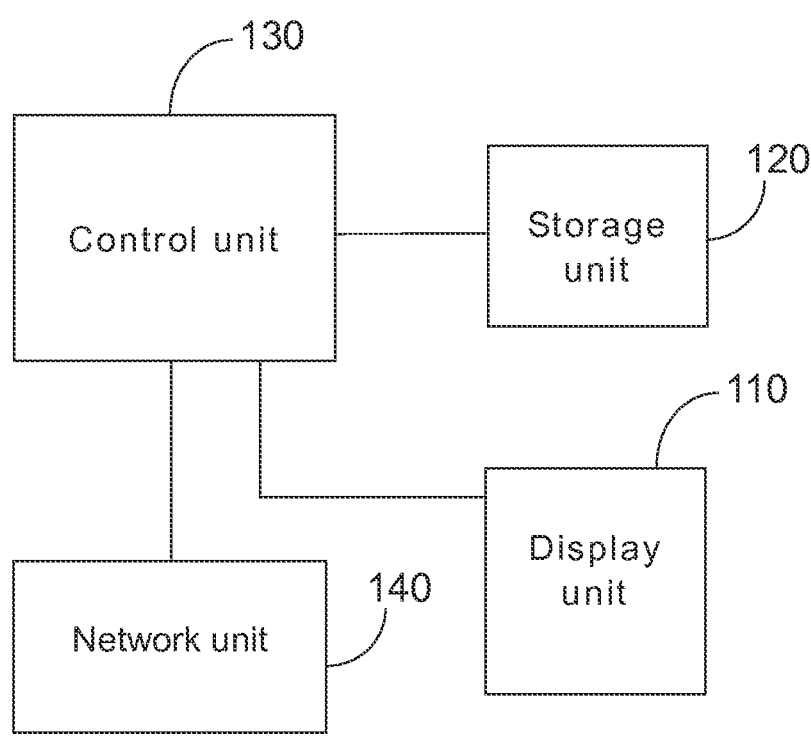
FIG. 4 is a fundamental structure of a network-based multimedia reproduction system having virtual channels according to an embodiment.

FIG. 3 shows a flowchart of a method for personalized virtual channel management according to an embodiment. FIG. 4 shows a schematic diagram of a fundamental structure of a network-based multimedia reproduction system having virtual channels according to an embodiment. The method for personalized virtual channel management in FIG. 3 may be performed by the structure in FIG. 4. Referring to FIG. 4, a network-based multimedia reproduction system 100 having virtual channels includes a display unit 110, a storage unit 120, a control unit 130, and a network unit 140. Depending on design requirements, the network-based multimedia reproduction system 100 may be further provided with other devices such as an analog or digital TV tuner, a command receiver such as a receiver of a remote controller having physical buttons, or a wired or wireless remote controller. For example, in an embodiment, the network-based multimedia reproduction system 100 may be implemented as a circuit having a playback function for playing received analog or digital television channel signals or other functions. In another embodiment, the network-based multimedia reproduction system 100 may also implemented as a circuit capable of displaying or playing multimedia files stored in a storage unit (e.g., a portable disk, a hard disk and a system memory), such as photos, videos, audio files and music. Further, when the network-based multimedia reproduction system 100 is implemented as a network-based multimedia player, the display unit 110 may be implemented as a display screen integrated with the network-based multimedia player, or may be regarded as a display screen that connects to the network-based multimedia player via wired or wireless means. It should be noted that a structure for performing the method for personalized virtual channel management is not limited to the structure in FIG. 4, as the structure in FIG. 4 is merely for illustrative purposes in the description below.

With reference to FIG. 3, a method for virtual channel management according to an embodiment includes the following steps. In step S110, in response to a received command, a control unit 130 of the network-based multimedia reproduction system 100 determines whether the command is associated with virtual channel switching. The network-based multimedia reproduction system 100 is in a mode of a first channel zone of a personalized channel zone. For example, it is determined whether a k-digit (e.g., 3-digit) channel code corresponding to the received command represents associated virtual channel switching. In step S115, when the command is associated with virtual channel switching, the control unit 130 checks whether a channel number (e.g., a numerical code of an arbitrary text or such as youtube, mail or ABC, or a code such as a 3-digit channel value 100 or 201) exists in the first channel zone. In step S117, when the channel value exists in the first channel zone, the control unit 130 executes an application corresponding to the channel value in the first channel zone to retrieve digital contents and display the digital contents on a screen of the network-based multimedia reproduction system 100 by a network unit 140 of the network-based multimedia reproduction system 100. When the channel value does not exist in the virtual channel table, the original channel is sustained, e.g., an image on the screen stays on a current channel or is switched to a predetermined channel.

In step S120, when the received command is associated with switching of the personalized channel zone (e.g., the command corresponds to a (k+1)-digit or above (k+1)-digit code, or a different representation such as starting or ending with a character such as A001), from the personalized channel zone, the control unit 130 determines that a desired channel zone (i.e., a channel zone to be switched to) represents a channel value corresponding to the received command. For example, it is determined that a four-digit channel code corresponding to the received command represents switching of the associated personalized channel zone, e.g., 2001 means that the desired channel zone is 2. When the channel zone representing the channel value does not exist in the personalized channel zone, the original channel is sustained, e.g., an image on the screen stays on a current channel or is switched to a predetermined channel.

In step S130, the control unit 130 checks whether at least one log-in command matches log-in information required for switching to the desired channel zone. For example, the network-based multimedia reproduction system 100 receives the at least one log-in command entered by a user. For example, the at least one log-in command is a password, or a user name and a password.

In step S140, when the at least one log-in command matches the log-in information required for switching to the desired channel zone, the network-based multimedia reproduction system 100 switches to a mode of the desired channel zone in the personalized channel zone. Through the control unit 130, the network-based multimedia reproduction system 100 achieves virtual channel switching and displays digital contents according to a plurality of virtual channels (e.g., CH001 CH006) corresponding to the desired channel zone (e.g., the channel zone 2). In step S135, when the at least one log-in command does not match the log-in information (e.g., a wrong password is entered) for switching to the desired channel zone, the original channel is sustained, e.g., an image on the screen stays on a current channel or is switched to a predetermined channel.

Accordingly, the above method for virtual channel management enables the network-based multimedia reproduction system 100 to perform classified management for different users, so as to prevent users from watching prohibited virtual channels.

Figure 5:
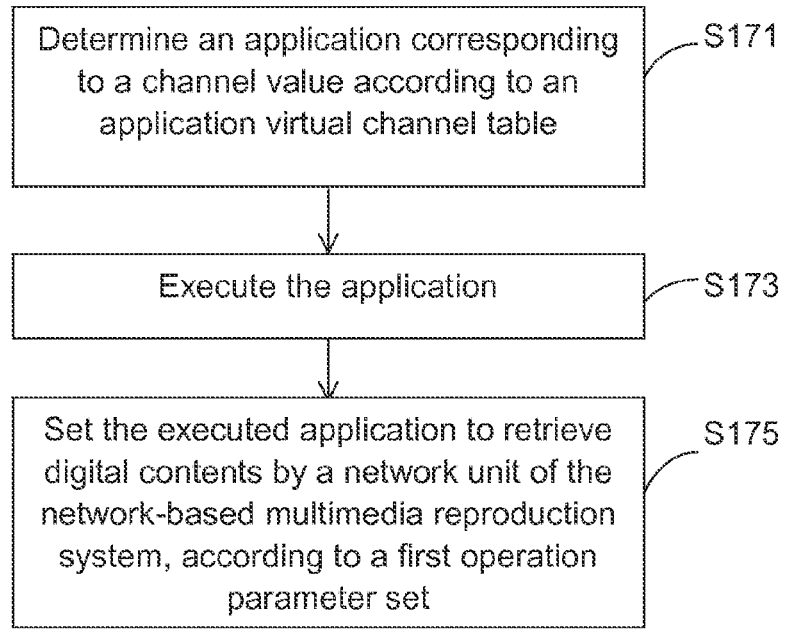
FIG. 5 is a flowchart of step S117 according to an embodiment.

For example, step S117 may be implemented as an embodiment in FIG. 5. Referring to FIG. 5, in step S171, the application corresponding to the channel value is determined according to an application virtual channel table of the first channel zone. In step S173, the application is executed. In step S175, the control unit 130 sets the executed application to retrieve digital contents and display the digital contents on a screen of the network-based multimedia reproduction system by the network unit according to a first operation parameter set corresponding to the application.

In the embodiment in FIG. 5, the first operation parameter set includes at least one operation command for controlling the application to obtain the digital contents. Further, the first operation parameter set corresponding to the application is included in the application virtual channel table.

Figure 6:
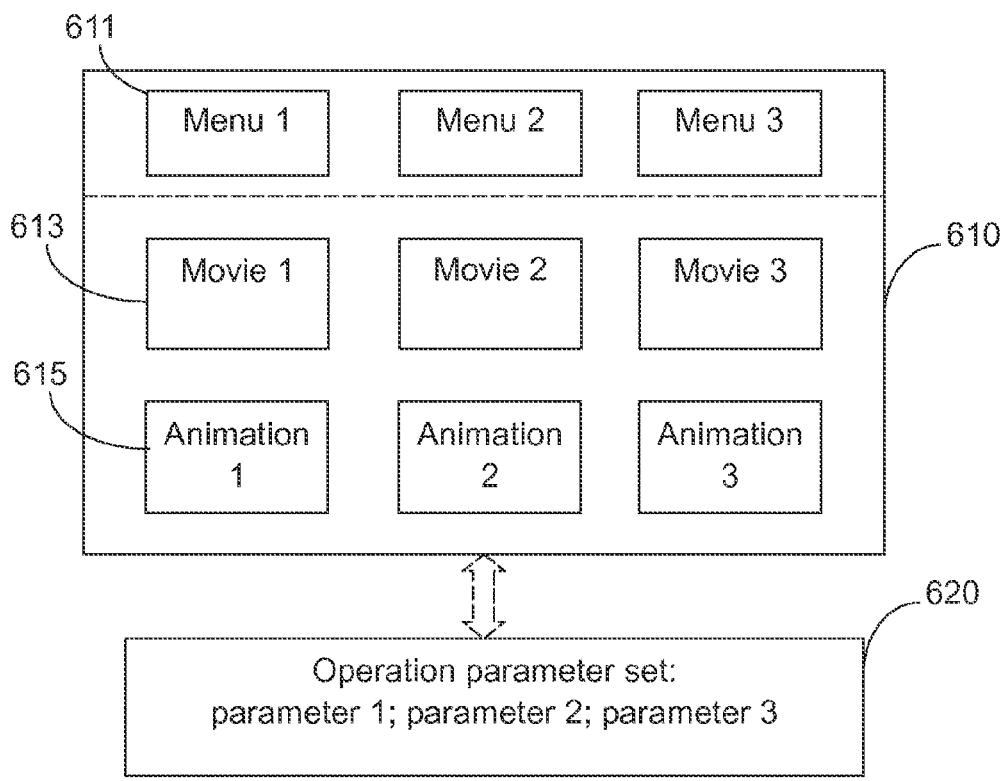
FIG. 6 is a schematic diagram of an application and a corresponding operation parameter set according to an embodiment.

FIG. 6 shows a schematic diagram of an application and a corresponding operation parameter set according to an embodiment. Since each application has a custom user operation interface and a custom approach for providing contents, a user usually needs to learn and adapt to different operation approaches. Moreover, a user is required to employ four direction buttons (i.e., up, down, left and right arrow buttons), a confirm or select button, and a back or return button to select desired contents. For example, an application 620 is an Internet TV browser application of PPTV. After the application is activated, a user interface of the application may include multiple command rows 611, multiple icons 613 representing movies or multiple icons 615 representing animations.

An operation parameter set 620 corresponding to the application may include one or more parameters, e.g., a parameter 1, a parameter 2 and a parameter 3. These parameters correspond to a virtual channel, which corresponds to an operation for activating the application to present the image of desired contents to a screen of the network-based multimedia reproduction system. For example, in the network-based multimedia reproduction system, the virtual channel table and the operation parameter set may be predetermined, configured by a user, or obtained from other sources. Thus, a virtual channel 810 may be set to correspond to an Internet TV application (e.g., a PPTV application) that automatically plays three most popular movies. Further, the operation parameter set may be set as: selecting three most popular movies (represented by a parameter "TopMovie"), automatically playing the three selected movies (represented by a parameter "AutoPlay", and repeating the three selected movies (represented by a parameter "Repeat"). The above parameters may generally refer to data for interacting with the network-based multimedia reproduction system (e.g., a program management module), such as commands, setting values required by the commands, response or notification messages, or other data.

In an embodiment, an application, implemented according to the method for retrieving digital contents of virtual channels, may be designed as an interactive programming interface of the network-based multimedia reproduction system. Further, the application may also be designed as being capable of interpreting and responding to parameters sent from the control unit 130 of the network-based multimedia reproduction system to allow the network-based multimedia reproduction system to control behaviors of the application. Thus, the technique of virtual channels of the application can be implemented to offer a user with a convenient channel switching approach, thereby mitigating or eliminating complicated operations on a remote controller.

Designation and Configuration of Virtual Channels

In an embodiment, the above virtual channels can be divided into at least two categories. One of the categories is "factory default channels" that cannot be modified by users, and the other is "user customized channels". The former factory default channels may be further classified into operation function channels and content channels. The latter user customized channels may be configured according to user preferences or according to content suitability. Details of the two above categories are described below.

Operation function channels of factory default channels include application channels that are not watch-oriented, such as configuration pages (e.g., system settings), directory pages (e.g., a program guide), and entry points. For example, a sequence of the channel codes of the virtual channels are pre-configured at a frontmost end of all the virtual channels, e.g., from 0, 1, 2, 3 and onwards. A digit of the channel codes may be any desired length. Assuming that the channel code is 4-digit, a user may add 0 to the beginning. As far as a system end is concerned, channels called by 0001 and 1 are the same channel. The first number, as beginning with 0, may be represent that the channel code corresponds to an operation function channel of factory default channels.

Content channels of factory default channels include virtual channels of factory default entry points, such as a video sharing website (e.g., YouTube), webmail (e.g., Gmail), a social website (e.g., Facebook), Internet phone (e.g., Skype), and Internet news. These applications and channels are pre-installed as factory default. However, the above implementation details and examples are not to be construed as limitations to the disclosure.

The user customized channels can be managed by a user with management permission to the virtual channels. Via the predetermined entry points, a user can configure the virtual channels with digital contents of user interests. The user customized channels may be ordered following the operation function channels and the content channels, and begin with a number 1, e.g., 1000, assuming the user customized channels are 4-digits.

In an embodiment, from the foregoing personalized channel zone configured from virtual channels, a channel zone may be designated to one user or a group of users. For example, young, grown-up and elderly users respectively have a corresponding channel zone, or personnel with different job posts in a group respectively have a corresponding channel zone. Alternatively, the network-based multimedia reproduction system 100 may be set to automatically switch to a predetermined personalized channel zone after system power-on, or to determine to which personalized channel zone to switch to after power-on according to an entered channel number.

TABLE 1

| Channel code range | Designated User | Channel Zone Category |
| --- | --- | --- |
| 0000-0999 | | Default channel zone |
| 1000-1999 | User 1 | Public |
| 2000-2999 | User 2 | Private |
| 3000-3999 | User 3 | Private |
| 4000-4999 | User 4 | Private |
| 5000-5999 | User 5 | Private |
| 6000-6999 | User 6 | Private |
| 7000-7999 | User 7 | Private |
| 8000-8999 | User 8 | Private |
| 9000-9999 | User 9 | Private |

Referring to the 4-digit channels in Table-1 for example, channel codes 0000 to 0999 are a factory default channel zone. Channel codes 1000 to 9999 are a user customized personalized channel zone, in which users can configured channel contents according to preferences. The personalized channel zone is partitioned into nine sections. The first section with the channel codes 1000 to 1999 are an open channel zone allowing any user to configure channels and access corresponding channel contents. The second to ninth sections with channel codes 2000 to 9999 are private channel zones, which can only be configured or accessed with valid passwords. In practice, Table-1 or other corresponding relations based on Table-1 may be regarded as one or more data structures or databases, and may be stored the storage unit 120, e.g., a non-volatile memory or a hard disk, for the use of the control unit 130.

In an embodiment, by applying the method for personalized virtual channel management of the embodiment in FIG. 3, assuming that the network-based multimedia reproduction system 100 in a normal power-on condition is in a mode of a particular channel zone (e.g., an open channel zone, a private channel zone, or a default channel zone) of the personalized channel zone, a 3-digit channel code may be entered to select a virtual channel corresponding to the channel zone. If a 4-digit channel code 2xxx is entered to switch to the second zone, or a 4-digitl channel code 9xxx is entered to switch to the ninth zone of the private channel zones, the corresponding private channel zones can only be accessed given that correct log-in information (e.g., a password) is entered. By entering a 4-digit channel code 1xxx, the open channel zone can be switched to and accessed by any user without requiring log-in information.

Figure 7:
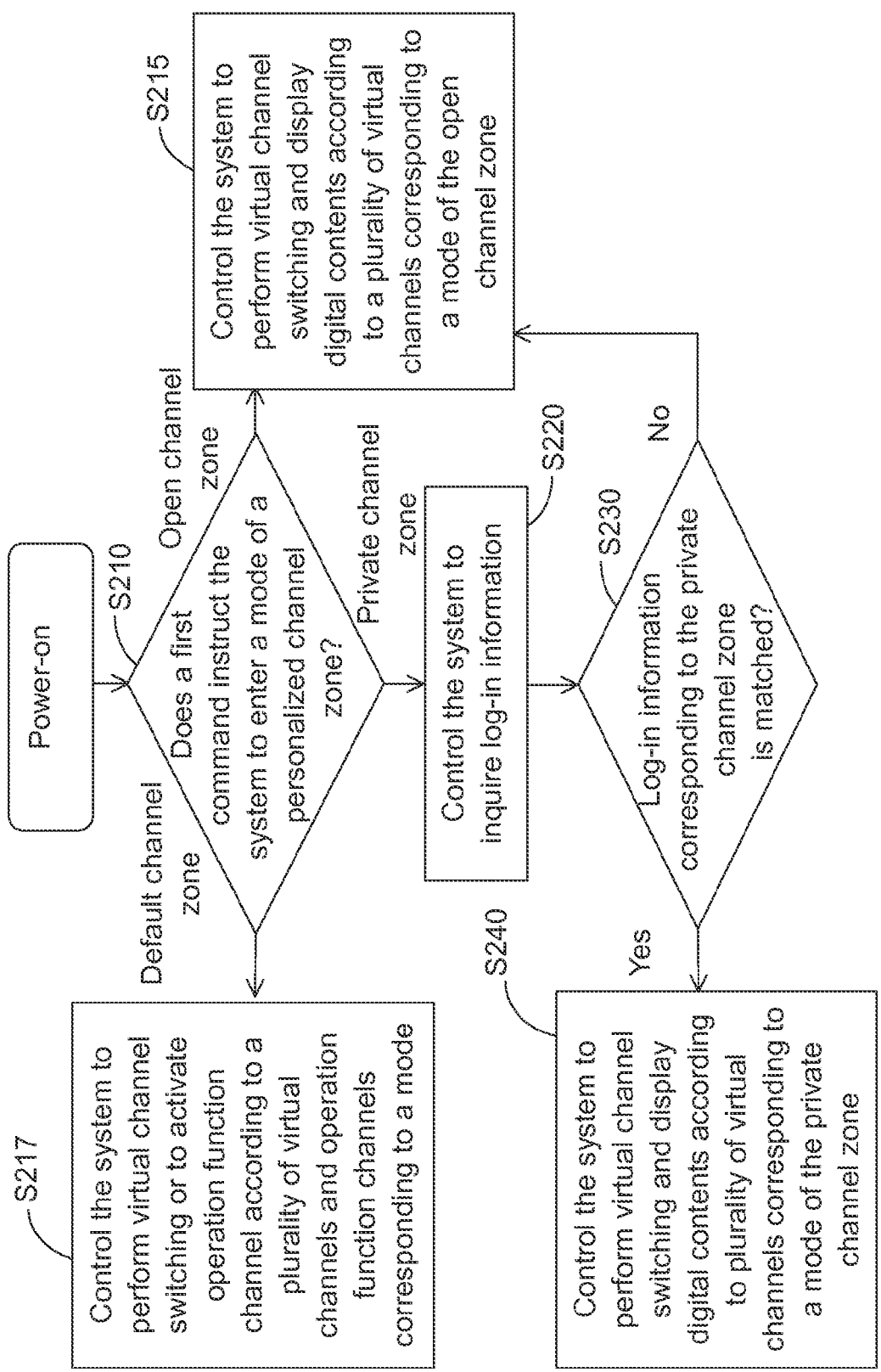
FIG. 7 is a flowchart of a method for personalized virtual channel management according to an embodiment.

Alternatively, the network-based multimedia reproduction system 100 may be set to automatically enter a predetermined channel zone after power-on, e.g., an open channel zone, a default channel zone, or a private channel zone. In another embodiment, the network-based multimedia reproduction system 100 may be set to enter a predetermined channel zone via a user selection or user log-in after power-on, as shown in a flowchart of a method for personalized virtual channel management according to an embodiment in FIG. 7. Referring to FIG. 7, in step 210, in response to a first command, the control unit 130 determines whether the first command is for instructing the network-based multimedia reproduction system 100 to enter a mode of the personalized channel zone. For example, in a power-on procedure, the network-based multimedia reproduction system 100 may display a menu or graphic user interface on a screen to allow a user to send a command (referred to as a first command) by the controller 20 to select and enter an open channel zone, a default channel zone or a private channel zone.

In step 215, when the first command instructs the network-based multimedia reproduction system 100 to enter a mode of an open channel zone of the personalized channel zone, the control unit 130 controls the network-based multimedia reproduction system 100 to perform virtual channel switching and display digital contents according to a plurality of virtual channels corresponding to the mode of the open channel zone.

In step 220, when the first command instructs the network-based multimedia reproduction system 100 to enter a mode of a private channel zone of the personalized channel zone, the control unit 130 controls the network-based multimedia reproduction system 100 to inquire log-in information. For example, an inquiry message is displayed on the screen of the network-based multimedia reproduction system 100.

In step 230, in response to at least one log-in-associated command, the control unit 130 determines whether the at least one log-in-associated command matches log-in information corresponding to the private channel zone (e.g., a password corresponding to the private channel zone).

In step 240, when the at least one log-in-associated command matches the log-in information corresponding to the private channel zone, the control unit 130 controls the network-based multimedia reproduction system 100 to perform virtual channel switching and display digital contents according to a plurality of virtual channels corresponding to the mode of the private channel zone.

Further, when the first command instructs the network-based multimedia reproduction system 100 to enter a mode of a default channel zone instead of the personalized channel zone, as shown in step S217, according to a plurality of virtual channels and operation function channels corresponding to the mode of the default channel zone, the control unit 130 controls the network-based multimedia reproduction system 100 to switch to a content virtual channel to display digital contents, or to activate an operation function channel to perform a corresponding system operation.

The embodiment in FIG. 7 and the embodiment in FIG. 3 may be jointly implemented.

In an embodiment, after entering the personalized channel zone, a user is only required to enter one to three digitals for switching channels rather than having to memorize or entering a series of lengthy numerical combinations. For an elderly, young or technology-unacquainted user, the user may conveniently follow the above approach and easily watch desired contents without being perplexed or disturbed by complicated Internet TV operations. Regarding the installation and configuration of the TV channels and contents, the associated operations may be performed by an administrator (e.g., a parent or a management user). The complicated configurations and Internet operations are designated to the factory default channel zone CH0000 to CH0999.

When an administrator assists a technology-unacquainted user or a random user in configuring the channel contents, the first zone may be designated, i.e., the open personalized channel zone (the open channel zone), and the network-based multimedia reproduction system 100 may be set to automatically to switch to the open channel zone after power-on. Thus, the default channel zone with the channel codes 0000 to 0999 may be considered as non-existent or hidden for the above type of users. It should be noted that the implementation of the above embodiment is not limited to the above approach.

For example, assume that certain technology-unacquainted friends and relatives only prefer watching TV series, variety shows and news channels, and sharing daily life photos or videos or making video calls through the Internet TV with friends and relatives from afar. The administrator may then set the Internet TV to automatically switch to the first channel zone after powering on the Internet TV, and complete the configuration of the contents of each of the channels in advance. For example, the administrator configures a channel code 1005 to a TV series, a channel code 1006 to a variety show, a channel code 1007 to a news channel, a channel code 1008 to daily life photos, a channel code 1009 for daily life videos, a channel code 101 to friends and relatives on the US East Coast, and a channel code 1011 to friends and relatives on the US West Coast.

In an embodiment, the network-based multimedia reproduction system 100 provides a simplified operation approach. Thus, for a technology-unacquainted user, memorizing or performing any sophisticated operations nor entering a lengthy 4-digit numerical combination is required. More specifically, after power-on, by entering a numerical value (or a character), e.g., 5 for watching a TV series, 6 for watching a variety show, 7 for watching a news channel, or a previous or next button (CH +/−) for a previous or a next channel, the above channels can be switched to while associated applications and contents may also be automatically activated.

TABLE 2

| Channel code range | Purpose |
| --- | --- |
| 0000-0099 | System |
| 0100-0199 | Recommended applications |
| 0200-0299 | Webmail |
| 0300-0399 | Photos |
| 0400-0499 | Social network |
| 0500-0599 | Communication |
| 0600-0699 | News |
| 0700-0799 | Audios |
| 0800-0999 | Videos |

The default channel zone may include operation function channels, and content channels corresponding to applications. Table-2 shows an example of dividing virtual channel codes of virtual channels based on functions. With factory default, the channels may be partitioned according to predetermined applications and contents. In this example, the factory default channel zone containing 1000 channels (with channels codes 0 to 999) is partitioned into nine function sections. Planning and applications of the factory default channel zone are described below.

The first section including channel codes 0000 to 0099 is reserved for system-dedicated function channels. The first section may be applied for system setup (corresponding to the channel code 0000 or 0), an application list (corresponding to the channel code 0001 or 1), an EPG (corresponding to the channel code 0002 or 2), a user guide (corresponding to the channel code 0003 or 3), system messages, and public programs. The functions of these channels in the first section are basically fixed and cannot be modified by a user. It should be noted that the above details are for exemplifying purposes rather than limiting the disclosure.

The second section including channel codes 0100 to 0199 is reserved for activations of factory-recommended applications or Internet service contents.

The third section including channel codes 0200 to 0299 is reserved for webmail-related applications, e.g., Gmail, Hotmail and Yahoo Mail.

The fourth section including channel codes 0300 to 0399 is reserved for photo-related applications, e.g., Picassa, and Flickr, Facebook Photo.

The fifth section including channel codes 0400 to 0499 is reserved for social network-related applications, e.g., Facebook, Twitter, MySpace and Google+.

The sixth section including channel codes 0500 to 0599 is reserved for communication-related applications, e.g., MSN and Skype.

The seventh section includes channel codes 0600 to 0699 is reserved for news-related applications, e.g., weather forecast, stock market, local news and international news.

The eighth section including channel codes 0700 to 0799 is reserved for audio-related applications, e.g., Music Player, Pandora and Internet Radio.

The ninth section including channel codes 0800 to 0999 is reserved for video-related applications, e.g., YouTube, Netflix, Amazon VOD and PPTV.

In an embodiment, when the system executes initial settings after the first power-on, the system presents the channel function classification table on a screen to inform a user of the contents corresponding to the virtual channels. For example, the contents in Table-2, or the representative names and channel codes of the virtual channels of the sections in Table-2 are displayed on a user interface. In an alternative embodiment, when receiving a new Internet video program and new contents or when installing a new application, the system automatically designates a new virtual channel code (according to the above classification table) according to a property of the contents, so that the designated channel number may also conform to a user habit.

In an embodiment, the channels in the private channel zones may also be configured as those in the default channel zone. For example, from the channel codes of the eighth section including channel codes 8000 to 8999, the channel codes 8000 to 8004 may be reserved for system-dedicated function channels of the section. For example, the channel code 8000 is used for system setup of the section, the channel code 8001 is used for a personalized application list of the section, and the code 8003 is used for a user guide of the section. Further, channel configurations of other private channel zones may also be configured similarly, so that when the user is in a particular private section, the user can immediately learn an application list of the section as, e.g., a channel code 2, is selected.

Parental Lock

In an embodiment, the embodiment in FIG. 3 may be applied for parental lock to prevent children from watching inappropriate videos and contents and from installing or changing system settings. The allowed contents are all allocated in the open channel zone, to which the system automatically switches each time after the system is powered on.

To prevent young and elderly users in the household from altering system settings, in an embodiment, the factory default channel zone may also be locked and protected by a password. Thus, as being prohibited from not only accessing channels and contents without parent approvals but also entering the factory default channel zone and performing application execution and installation or changing system contents of the factory default channel zone, the young and elderly users have limited access to only the channels in the open channel zone.

Figure 8:
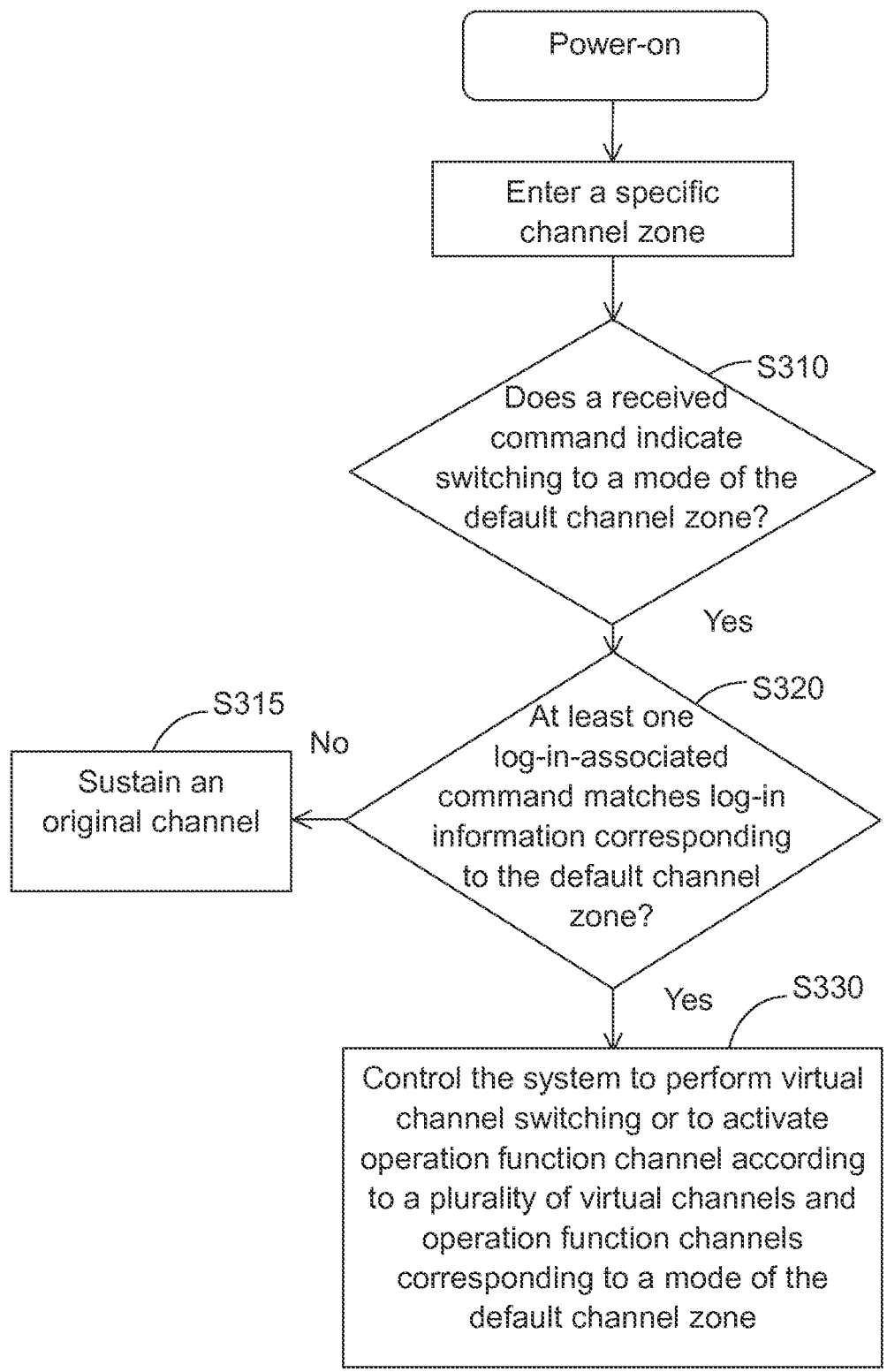
FIG. 8 is a flowchart of a method for personalized virtual channel management according to another embodiment.

FIG. 8 shows a method for personalized virtual channel management according to an embodiment. In step S310, in response to a received command, it is determined whether the received command instructs switching to a mode of a default channel zone. In step S320, when the received command instructs switching to the mode of the default channel zone, in response to at least one log-in-associated command, the control unit 130 determines whether the at least one log-in-associated command matches log-in information corresponding to the default channel zone. In step S330, when the at least one log-in-associated command matches the log-in information corresponding to the default channel zone, according to a plurality of virtual channels and operation function channels corresponding to the default channel zone, the control unit 130 controls the network-based multimedia reproduction system 100 to perform virtual channel switching to display digital contents or to activate an operation function channel to perform a corresponding system operation. When the at least one log-in-associated command does not match the log-in information, as shown in step S310, the original channel is sustained, e.g., an image on the screen stays on a current channel of the current channel zone (e.g., the open channel zone) or is switched to a predetermined channel of the current channel zone.

The embodiment in FIG. 8 may be jointly implemented with the embodiment in FIG. 3. For example, if it is determined in step S310 that the received command is associated with virtual channel switching or associated with switching of the personalized channel zone, associated switching may be performed as the embodiment in FIG. 3. At this point, the first channel zone is regarded as an open channel zone.

In continuation of the embodiment in FIG. 8, when the network-based multimedia reproduction system is in the mode of the default channel zone, a parent or a management user (i.e., an administrator) can activate operation function channels, e.g., to configure the virtual channels in the default channel zone. In general, a parent or an administrator assigns rated videos to private personalized channel zones, which can only be accessed by users with a valid password. The rated contents are prohibited from being assigned to the open channel zone in principle, and the system may display an alert message as a reminder when assigning the rated contents to the open channel zone is attempted. For example, the embodiment in FIG. 8 may further include: in response to an operation function for executing a system operation to assign a restricted virtual channel to the open channel zone, controlling the network-based multimedia reproduction system to prompt an alert message. Further, whether the assignment is to be performed can be determined by a user.

A computing device readable information storage medium is further provided according to an embodiment. The computing device readable information storage medium stores at least one program (or regarded as a software module) for executing the method for personalized virtual channel management in at least one of the above embodiments. When a computing device (e.g., an electronic device such as the foregoing network-based multimedia reproduction system or a computer) including a memory loads the information storage medium, the electronic computing system executes multiple program instructions for executing the method for personalized virtual channel management in at least one of the above embodiments. For example, the computing device readable information storage medium is an optical information storage medium, a magnetic information storage medium, firmware, or a code transmittable via a network/transmission medium (e.g., air).

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for virtual channel management, for use in a network-based multimedia reproduction system, the method comprising:

in response to a received command, determining, by a control unit of the network-based multimedia reproduction system, whether the command is associated with virtual channel switching, wherein the network-based multimedia reproduction system is in a mode of a first channel zone of a personalized channel zone;

checking whether a channel value corresponding to the command exists in the first channel zone by the control unit when the command is associated with virtual channel switching;

when the channel value exists in the first channel zone, executing an application corresponding to the channel value in the first channel zone by the control unit to retrieve digital contents by a network unit of the network-based multimedia reproduction system and to display the digital contents on a screen of the network-based multimedia reproduction system;

when the received command is associated with switching of the personalized channel zone, determining a desired channel zone from the personalized channel zone representing a channel value corresponding to the received command by the control unit;

checking whether at least one log-in command matches log-in information required for switching to the desired channel zone by the control unit; and switching the network-based multimedia reproduction system to a mode of the desired channel zone in the personalized channel zone when the at least one log-in command matches the log-in information for switching to the desired channel zone;

wherein the network-based multimedia reproduction system performs virtual channel switching and displays the digital contents according to a plurality of virtual channels corresponding to the desired channel zone.

2. The method for virtual channel management according to claim 1, before the network-based multimedia reproduction system is in the mode of the personalized channel zone, further comprising:

in response to a first command, determining, by the control unit, whether the first command instructs the network-based multimedia reproduction system to enter the mode of the personalized channel zone;

when the first command instructs the network-based multimedia reproduction system to enter a mode of an open channel zone of the personalized channel zone, controlling the network-based multimedia reproduction system to perform virtual channel switching and display digital contents by the control unit according to a plurality of virtual channels corresponding to the mode of the open channel zone;

controlling the network-based multimedia reproduction system to inquire the log-in information by the control unit when the first command instructs the network-based multimedia reproduction system to enter a mode of a private channel zone of the personalized channel zone;

in response to at least one command log-in-associated, determining whether the at least one log-in-associated command matches log-in information corresponding to the private channel zone by the control unit; and controlling the network-based multimedia reproduction system to perform virtual channel switching and display digital contents by the control unit according to a plurality of virtual channels corresponding to the mode of the private channel zone when the at least one log-in-associated command matches the log-in information corresponding to the private channel zone.

3. The method for virtual channel management according to claim 2, wherein the first channel zone is the private channel zone of the personalized channel zone, and the desired channel zone is another private channel zone of the personalized channel zone.

4. The method for virtual channel management according to claim 2, further comprising:

when the first command instructs the network-based multimedia reproduction system to enter a mode of a predetermined channel zone instead of the mode of the personalized channel zone, controlling, by the control unit, the network-based multimedia reproduction system to perform channel switching and display digital contents, or to activate a system function channel to perform a system operation, according to a plurality of virtual channels and system function channels corresponding to the mode of the predetermined channel zone.

5. The method for virtual channel management according to claim 2, wherein the first channel zone is the open channel zone of the personalized channel zone.

6. The method for virtual channel management according to claim 1, further comprising:

determining whether the received command instructs switching to a mode of a predetermined channel zone in response to the received command;

when the received command instructs switching to the mode of the predetermined channel zone, determining whether at least one log-in-associated command matches log-in information corresponding to the predetermined channel zone in response to the at least one log-in-associated command; and when the at least one log-in-associated command matches the log-in information corresponding to the predetermined channel zone, controlling, by the control unit, the network-based multimedia reproduction system to perform channel switching and display digital contents, or to activate an operation function channel to perform a system operation, according to a plurality of virtual channels and operation function channels corresponding to the mode of the predetermined channel zone.

7. The method for virtual channel management according to claim 6, wherein when the network-based multimedia reproduction system is in the mode of the predetermined channel zone, the network-based multimedia reproduction system is controlled to prompt an alert message in response to the system operation performed by using the operation function channel to assign a restricted virtual channel to the open channel zone.

8. The method for virtual channel management according to claim 1, wherein the network-based multimedia reproduction system automatically enters the mode of the personalized channel zone after being powered on.

9. The method for virtual channel management according to claim 1, wherein the step of executing the application corresponding to the channel value in the first channel zone to retrieve the digital contents and display the digital contents on the screen of the network-based multimedia reproduction system by the network unit of the network-based multimedia reproduction system comprises:

determining the application corresponding to the channel value according to an application virtual channel table of the first channel zone;

executing the application; and setting, by the control unit, the executed application to retrieve the digital contents and display the digital contents on the screen of the network-based multimedia reproduction system, according to a first operation parameter set corresponding to the application.

10. The method for virtual channel management according to claim 9, wherein the first operation parameter set comprises at least one operation command for controlling the application to obtain the digital contents.

11. The method for virtual channel management according to claim 10, wherein the application virtual channel table includes the first operation parameter set corresponding to the application.

12. A non-transitory computing device readable information storage medium, storing at least one program module having instructions, which, when executed in a computing device, cause the computing device to perform the method for virtual channel management of claim 1.

13. A network-based multimedia reproduction system having virtual channels, comprising:
a display unit;
a storage unit, storing data of a personalized channel zone;
a network unit;
a control unit, coupled to the network unit, for determining whether a received command is associated with virtual channel switching in response to the received command, wherein the network-based multimedia reproduction system is in a mode of a first channel zone of the personalized channel zone; checking whether a channel value corresponding to the command exists in the first channel zone when the command is associated with virtual channel switching; and executing an application corresponding to the channel value in the first channel zone when the channel value exists in the first channel zone to retrieve digital contents and display the digital contents on the display unit of the network-based multimedia reproduction system by the network unit;
wherein the control unit is further operative to:
determine a desired channel zone from the personalized channel zone representing a channel value corresponding to the received command when the received command is associated with switching of the personalized channel zone;
check whether at least one log-in command matches log-in information required for switching to the desired channel zone; and
switch the network-based multimedia reproduction system to a mode of the desired channel zone in the personalized channel zone when the at least one log-in command matches the log-in information required for switching to the desired channel zone; and
wherein the control unit controls the network-based multimedia reproduction system to perform virtual channel switching to display digital contents, according to a plurality of virtual channels corresponding to the desired channel zone.

14. The network-based multimedia reproduction system according to claim 13, wherein before the network-based multimedia reproduction system is in the mode of the personalized channel zone, the control unit is further operative to:
in response to a first command, determine whether the first command instructs the network-based multimedia reproduction system to enter the mode of the personalized channel zone;
when the first command instructs the network-based multimedia reproduction system to enter the mode of an open channel zone of the personalized channel zone, control the network-based multimedia reproduction system to perform virtual channel switching and display digital contents according to a plurality of virtual channels corresponding to the mode of the open channel zone;
control the network-based multimedia reproduction system to inquire log-in information corresponding to the private channel zone when the first command instructs the network-based multimedia reproduction system to enter a mode of a private channel zone of the personalized channel zone;
in response to at least one log-in-associated command, determines whether the at least one log-in-associated command matches the log-in information corresponding to the private channel zone; and
control the network-based multimedia reproduction system to perform virtual channel switching and display digital contents according to a plurality of virtual channels corresponding to the mode of the private channel zone when the at least one log-in-associated command matches the log-in information corresponding to the private channel zone.

15. The network-based multimedia reproduction system according to claim 14, wherein the first channel zone is the private channel zone of the personalized channel zone, and the desired channel zone is another private channel zone of the personalized channel zone.

16. The network-based multimedia reproduction system according to claim 14, wherein the control unit is further operative to:
when the first command instructs the network-based multimedia reproduction system to enter a mode of a predetermined channel zone instead of the mode of the personalized channel zone, control the network-based multimedia reproduction system to perform channel switching and display digital contents, or to activate an operation function channel to perform a system operation, according to a plurality of virtual channels and operation function channels corresponding to the mode of the predetermined channel zone.

17. The network-based multimedia reproduction system according to claim 14, wherein the first channel zone is the open channel zone of the personalized channel zone.

18. The network-based multimedia reproduction system according to claim 13, wherein the control unit is further operative to:
determine whether the received command instructs switching to a mode of a predetermined channel zone in response to the received command;
when the received command instructs switching to the mode of the predetermined channel zone, determine whether at least one command log-in-associated command matches log-in information corresponding to the predetermined channel zone in response to the at least one log-in-associated command; and
when the at least one log-in-associated command matches the log-in information corresponding to the predetermined channel zone, control the network-based multimedia reproduction system to perform channel switching and display digital contents or to activate an operation function channel to perform a system operation, according to a plurality of virtual channels and operation function channels corresponding to the mode of the predetermined channel zone.

19. The network-based multimedia reproduction system according to claim 18, wherein when the network-based multimedia reproduction system is in the mode of the predetermined channel zone, the network-based multimedia reproduction system is controlled to prompt an alert message in response to the system operation performed by using the operation function channel to assign a restricted virtual channel to the open channel zone.

20. The network-based multimedia reproduction system according to claim 13, wherein the network-based multimedia reproduction system automatically enters the mode of the personalized channel zone after powered on.

21. The network-based multimedia reproduction system according to claim 13, wherein when the control unit executes the application corresponding to the channel value in the first channel zone, the control unit is operative to:
- determine the application corresponding to the channel value according to an application virtual channel table of the first channel zone;
- execute the application; and
- set the executed application to retrieve the digital contents and display the digital contents on the screen of the network-based multimedia reproduction system, according to a first operation parameter set corresponding to the application.

22. The network-based multimedia reproduction system according to claim 21, wherein the first operation parameter set comprises at least one operation command for controlling the application to obtain the digital contents.

23. The network-based multimedia reproduction system according to claim 22, wherein the application virtual channel table includes the first operation parameter set corresponding to the application.

* * * * *